US011241785B2

(12) United States Patent
Rose

(10) Patent No.: US 11,241,785 B2
(45) Date of Patent: Feb. 8, 2022

(54) TOOL TRAY

(71) Applicant: Jim Rose, Chardon, OH (US)

(72) Inventor: Jim Rose, Chardon, OH (US)

( * ) Notice: Subject to any disclaimer, the term of this patent is extended or adjusted under 35 U.S.C. 154(b) by 43 days.

(21) Appl. No.: 16/869,105

(22) Filed: May 7, 2020

(65) Prior Publication Data

US 2021/0347035 A1 Nov. 11, 2021

(51) Int. Cl.
*B62B 1/00* (2006.01)
*B25H 5/00* (2006.01)

(52) U.S. Cl.
CPC .................................... *B25H 5/00* (2013.01)

(58) Field of Classification Search
CPC ... B25H 5/00; B25H 3/00; B25H 3/02; B25H 3/04; B25H 3/06; B25H 1/0007; B25H 1/04
See application file for complete search history.

(56) References Cited

U.S. PATENT DOCUMENTS

| | | | | |
|---|---|---|---|---|
| 2,701,168 A * | 2/1955 | Schemers | B62B 3/10 | 182/116 |
| 4,309,009 A | 1/1982 | Mitchell | | |
| 4,341,304 A * | 7/1982 | Diller | B25H 3/06 | 108/44 |
| 4,782,916 A | 11/1988 | Hays | | |
| 4,795,180 A * | 1/1989 | Polcyn | B25H 3/00 | 206/373 |
| 4,874,147 A * | 10/1989 | Ory | E06C 7/14 | 248/210 |
| 4,947,961 A | 8/1990 | Dudley | | |
| 5,080,381 A * | 1/1992 | Perez | B25H 5/00 | 108/116 |
| 5,460,392 A | 10/1995 | Hansen | | |
| 5,669,463 A * | 9/1997 | Robertson | E06C 1/39 | 182/115 |
| 5,706,991 A * | 1/1998 | Stewart | B60R 11/06 | 108/44 |
| 6,038,984 A | 3/2000 | Freitag | | |
| D424,806 S * | 5/2000 | Dixon, Sr. | D3/304 | |
| 6,082,270 A | 7/2000 | Zerger | | |
| 6,109,435 A | 8/2000 | Failor | | |
| 6,240,856 B1 * | 6/2001 | Paskey | B25H 1/12 | 108/146 |
| 6,520,609 B1 * | 2/2003 | Beauregard | A47C 7/62 | 312/235.2 |
| D481,282 S * | 10/2003 | Kitchen | D3/318 | |
| 6,669,214 B1 * | 12/2003 | Domis | B25H 3/00 | 280/47.19 |
| 7,195,119 B2 * | 3/2007 | Lungo | E06C 7/14 | 182/129 |
| 7,237,781 B2 * | 7/2007 | Canova | B25H 5/00 | 280/32.6 |

(Continued)

*Primary Examiner* — James M Dolak

(74) *Attorney, Agent, or Firm* — Daniel M. Cohn; Howard M. Cohn

(57) ABSTRACT

A tool tray adapted to being placed on a floor and on a tire, comprising top and bottom facing surfaces surrounded by front and rear panels and first and second side panels. A plurality of supports projecting downward from the bottom facing surface to support the tool tray on the tire. A plurality of swivel caster wheels mounted to the bottom facing surface whereby the tool tray can freely move on the floor.

11 Claims, 5 Drawing Sheets

(56) References Cited

U.S. PATENT DOCUMENTS

| | | | | |
|---|---|---|---|---|
| 7,434,817 | B2 * | 10/2008 | Rush | B25H 5/00 280/32.5 |
| 8,708,168 | B2 * | 4/2014 | Lin | A47B 87/0207 211/131.1 |
| 9,421,684 | B1 | 8/2016 | Walcher | |
| 9,723,827 | B2 * | 8/2017 | Fesperman | A01L 11/00 |
| 9,770,101 | B2 * | 9/2017 | Graham | A47B 13/02 |
| 10,723,015 | B1 * | 7/2020 | Vallow | A47B 3/0815 |
| 11,097,412 | B2 * | 8/2021 | Dosky | A45F 3/04 |
| 2006/0027475 | A1 * | 2/2006 | Gleason | B25H 3/021 206/373 |

* cited by examiner

TOOL TRAY

TECHNICAL FIELD OF THE INVENTION

The present invention relates generally to tool trays. More particularly, the invention relates to tool trays having wheels and tire attachment means for detachably mounting the tray to a tire.

BACKGROUND OF THE INVENTION

A well-known issue for automobile mechanics and others who work on vehicles, particularly under the hood (generally referred to herein as "mechanics"), is that there is generally no place to keep tools during the course of such work. When tools are attempted to be kept within arms-reach, it is not uncommon for them to fall into the engine block or other hard to reach area in the vehicle. On the other hand, if the tools are kept in a tool box positioned nearby on a floor or shelf, the mechanic may end up wasting time by being forced to repeated stop work and walk over to the nearby tool box to retrieve desired.

As such, there remains a need for a tire attachable tool tray would provide a selectively deployable shelf suitable to hold tools within arms-reach of one working under a vehicle's hood. It would be helpful if such a tire attachable tool tray included a mounting mechanism Which enables the tray to be selectively set in a fixed position so as to prevent tools from sliding off. It would be additionally desirable for such a tire attachable tool tray to include a handle which allows a user to easily move the tray from place to place and to mount the tool tray onto the tire.

SUMMARY OF THE INVENTION

According to an embodiment of the present invention, there is disclosed a tool tray adapted to being placed on a floor and on a tire, comprising top and bottom facing surfaces surrounded by front and rear panels and first and second side panels. A plurality of supports projecting downward from the bottom facing surface to support the tool tray on the tire.

According to another embodiment of the present invention, there is disclosed a tool tray adapted to being placed on a floor and on a tire. The tool tray includes top and bottom facing surfaces surrounded by front and rear panels and first and second side panels. A plurality of rectangular supports projecting downward from the bottom facing surface to support the tool tray on the tire. A plurality of swivel caster wheels mounted to the bottom facing surface adjacent one of the rectangular supports and an adjacent corner of the tool tray whereby the bottom surface facing surfaces of the rectangular supports are spaced from the floor surface so that the tool tray can be easily moved around on the floor.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader and should not in any way be interpreted as limiting.

DETAILED DESCRIPTION OF THE PREFERRED EMBODIMENTS

Figure 1:
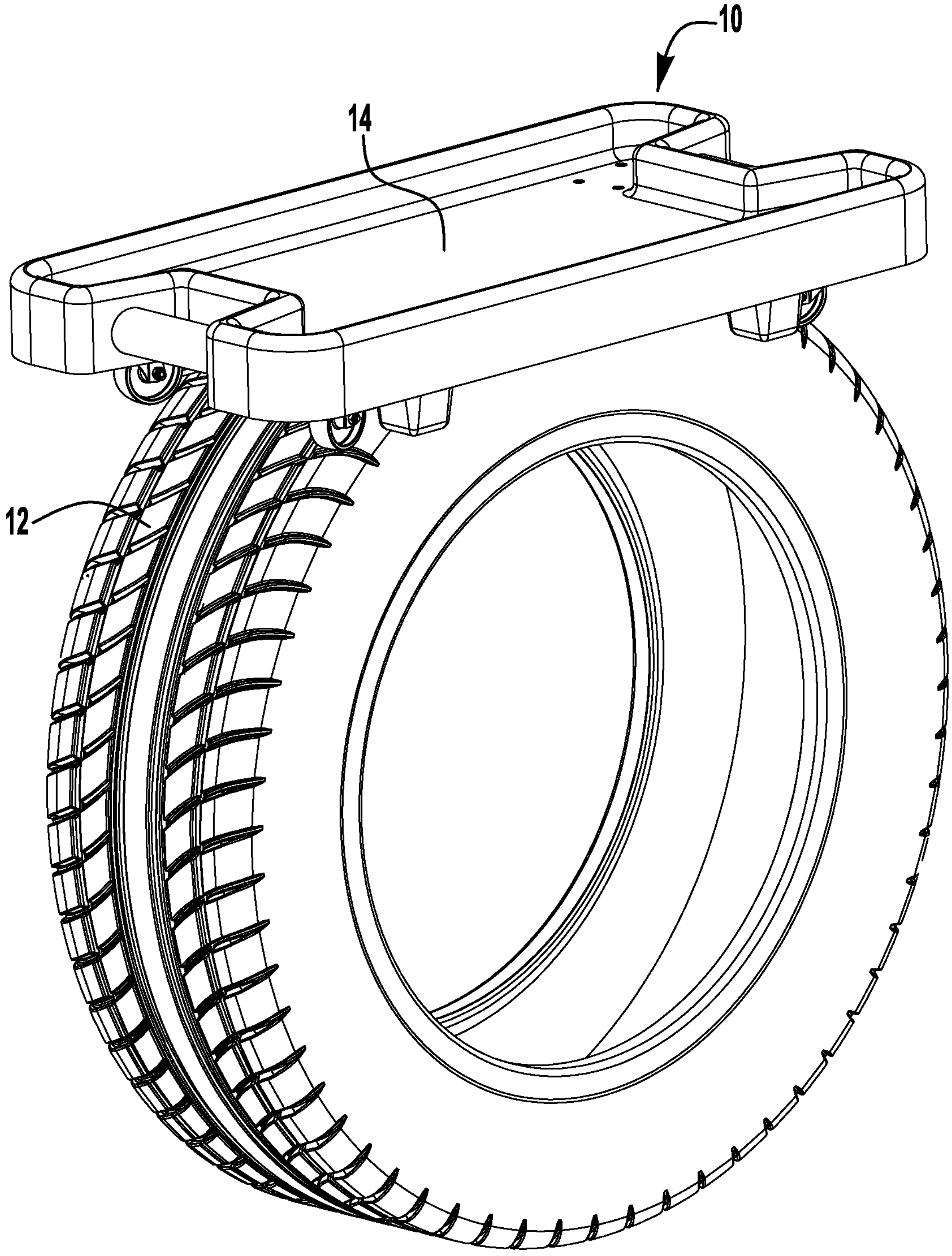
FIG. 1 is a front, three-dimensional view of the tool tray disposed on a tire, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

The present invention described herein provides for a tire attachable tool tray adapted to allow a user to selectively deploy a fixed tool shelf on the tire of a vehicle. The primary components in the tire attachable tool tray of the present invention are the shelf section adapted to be mounted on a tire and wheels or placed on a floor so that the tool tray can be easily moved around on the floor. In operation, the tire attachable tool tray enables a user to store tools desired to be used while working under a vehicle hood on a solid, flat surface that is generally within arms-reach and then, when desired, to mount the tool tray on the tire of a vehicle.

Referring to FIG. 1, there is illustrated a perspective view of a tool tray 10 disposed on a tire 12.

Figure 2:
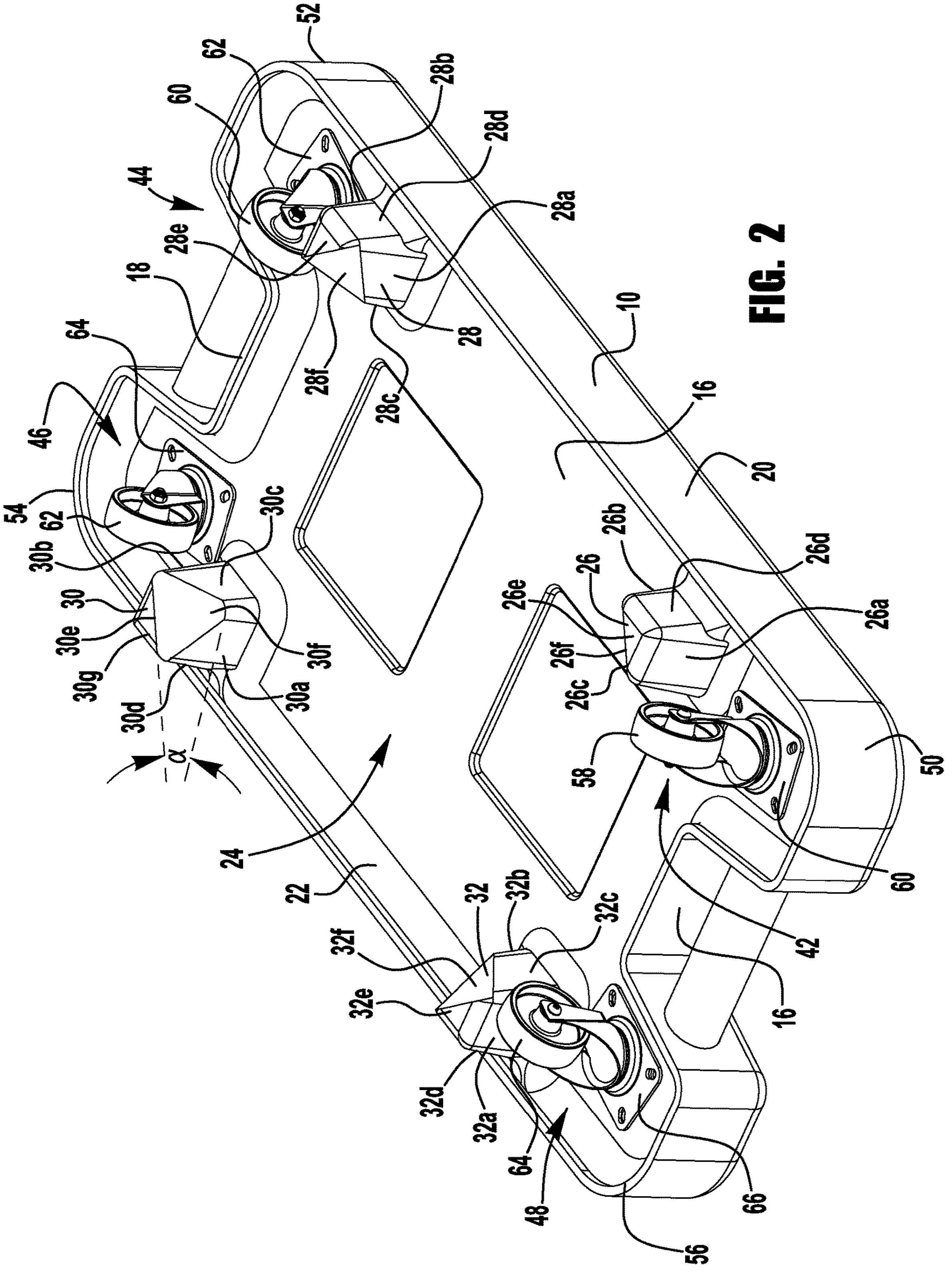
FIG. 2 is a bottom three-dimensional view of the tool tray, in accordance with the present invention.
Figure 3:
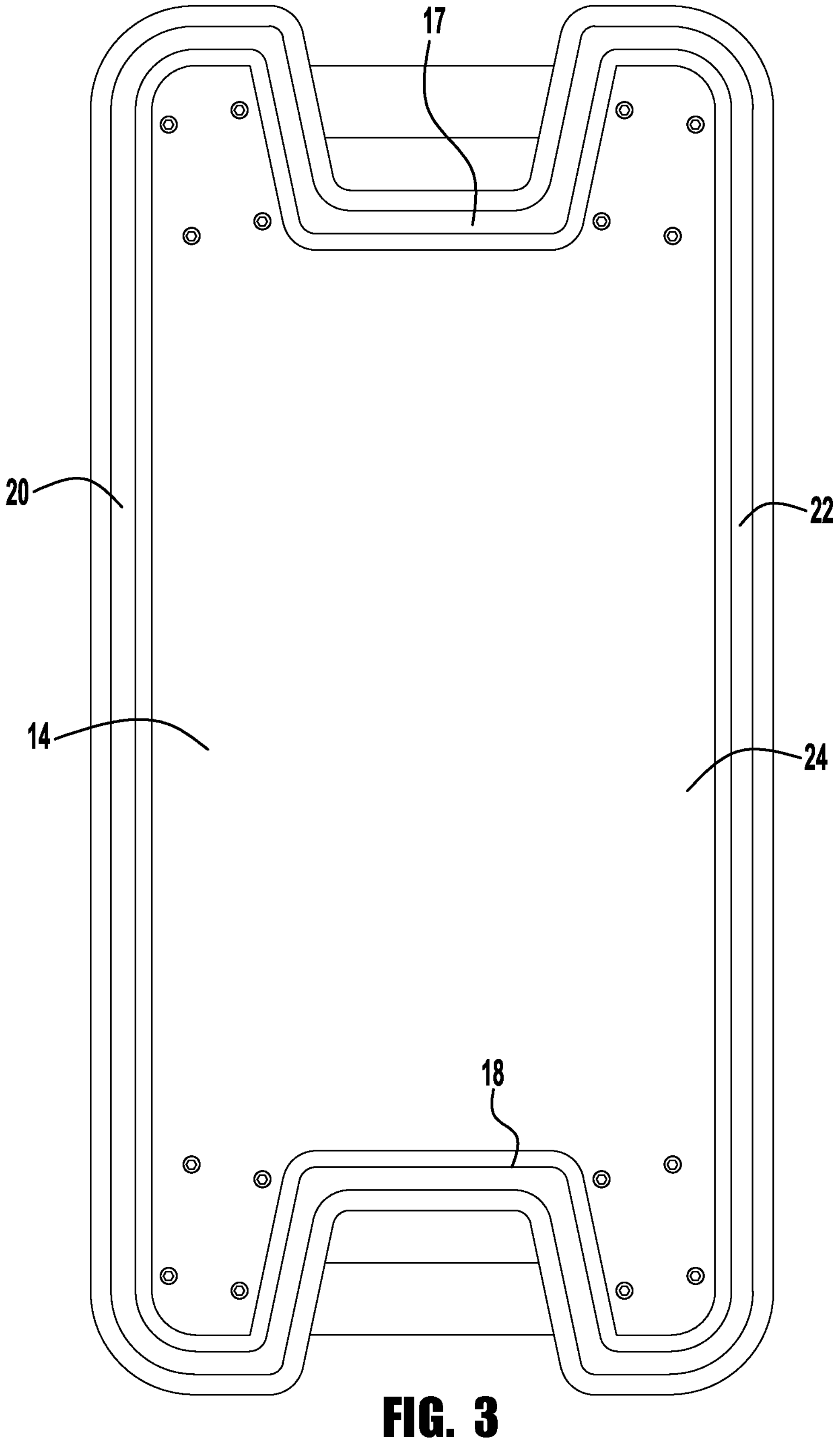
FIG. 3 is a top view of the tool tray accordance with the present invention.
Figure 4:
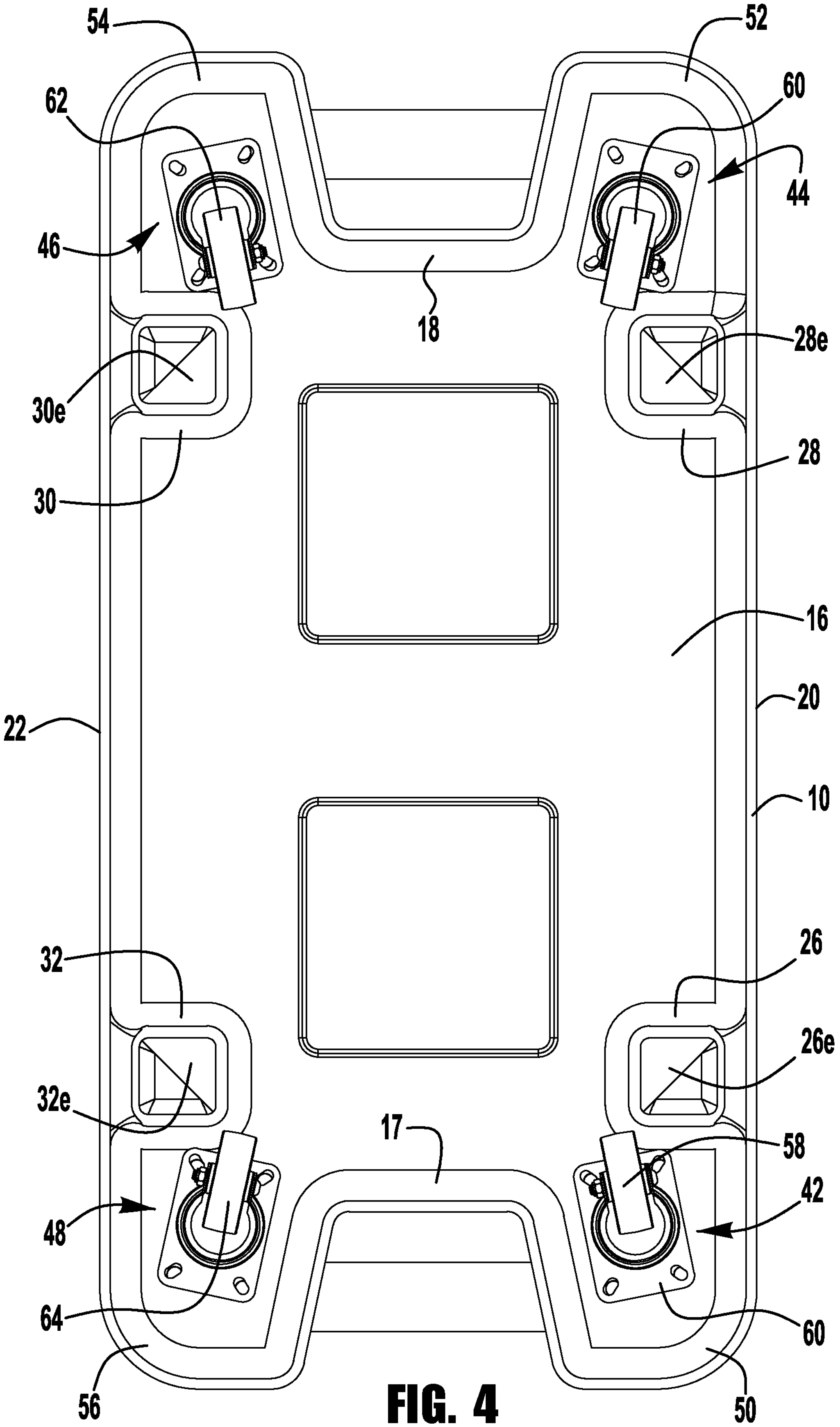
FIG. 4 is a bottom view of the tool tray, in accordance with the present invention.

Referring to FIGS. 2 and 3, the tool tray 10 has top and bottom facing surfaces 14 and 16 surrounded by front and rear panels 17 and 18 and side panels 20 and 22 to form an open top enclosure 24 for receiving and storing tools. Four rectangular supports 26, 28, 30 and 32 (26-32) project downward from the bottom facing surface 14 and are disposed adjacent the sidewalls 20 and 22 of the tool tray 10.

Each rectangular support 26-32 has a front facing wall 26*a*, 28*a*, 30*a*, and 32*a*, a rear facing wall (26*b*, 28*b*, 30*b*, and 32*b*), an inner facing wall (26*c*, 28*c*, 30*c*, and 32*c*), an outer facing wall (26*d*, 28*d*, 30*d*, and 32*d*) and a bottom facing wall (26*e*, 28*e*, 30*e*, and 32*e*) of each of the rectangular supports 26-32.

Each bottom facing wall (26*e*, 28*e*, 30*e*, and 32*e*) of each of the rectangular supports 26-32 has a triangular shape which interfaces with a sloping triangular shaped surface (26*f*, 28*f*, 30*f*, and 32*f*) that slopes downward at an angle a of about 30 degrees to about 60 degrees with respect to the bottom facing wall (26*e*, 28*e*, 30*e*, and 32*e*) of the rectangular supports 26, 28, 30, and 32, respectively.

The triangular bottom facing wall 26*e* of the rectangular support 26 interfaces with the front facing wall 26*a* and the outer facing wall 26*d*. The triangular shaped, bottom facing wall 28*e* of the rectangular support 28 interfaces with the outer facing wall 28*d* and the rear facing wall 28*b*. The triangular shaped, bottom facing wall 30*e* of the rectangular support 30 interfaces with the rear facing wall 30*b* and the outer facing wall 30*d*. The triangular shaped, bottom facing section of wall 32*f* of the rectangular support 32 interfaces with the rear front facing wall 32*b* and the outer facing wall 32*d*.

The purpose of the flat, triangular shaped, sloped surfaces (26*f*, 28*f*, 30*f*, and 32*f*) on the rectangular supports 26, 28, 30, and 32 is so that when the tool tray 10 is disposed on a tire 12, as shown in FIG. 1, the tire is guided and slides into place between the rectangular supports 26-32 by contacting the sloped surfaces of the rectangular supports. This is accomplished by the bottom surface 16 of the tool tray pressing against the curved top tread portion of the tire so as to stabilize the tool tray on the tire and prevent tilting in a front or rear direction on the tire.

Once the tool tray 10 is in place, typically with outer diameter of the tire resting against the bottom surface 16 of the tool tray 10, the tool tray is secure and can hold tools as needed. It is also within the terms of the present invention for the tool tray 10 to be securely held on the tire 12 by the friction between purpose of the triangular shaped, sloped surfaces 26*f*-32*f* on the rectangular supports and the sidewalls of the tire on which the tool tray 10 is disposed on a tire 12.

Figure 5:
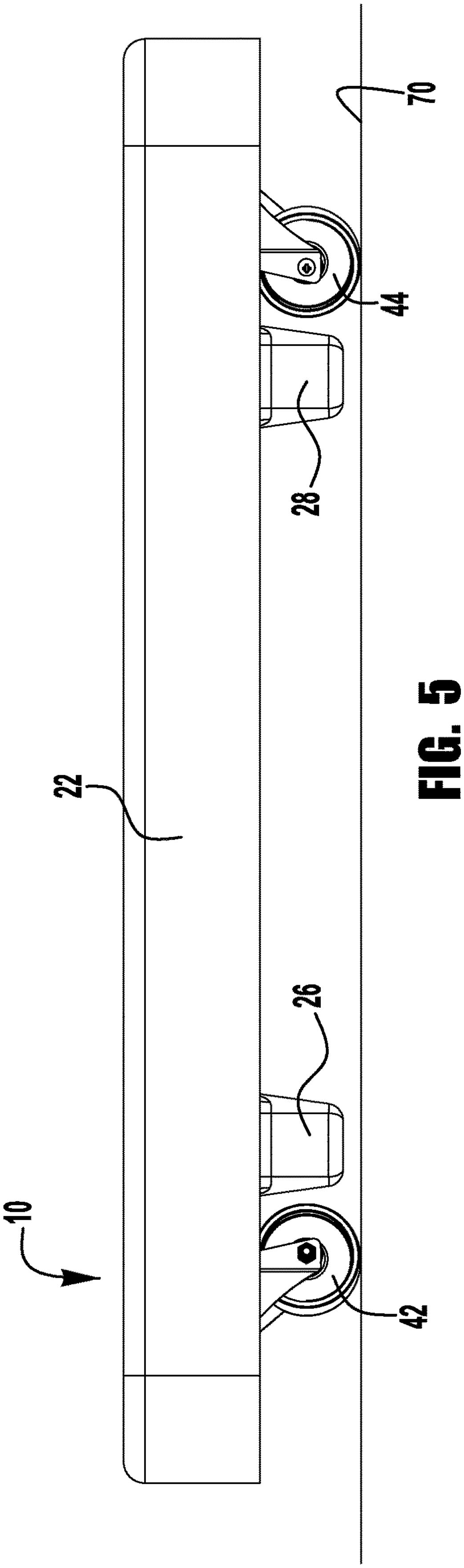
FIG. 5 is a side view of the tool tray sitting on a floor, in accordance with the present invention.

Swivel casters wheels 42, 44, 46 and 48 (42-48) are mounted to the bottom surface 16 of the tool tray. Each of the swivel casters wheels 42-48 is mounted between one of the rectangular supports 26-32 and one of the corners 50, 52, 54 and 56 (50-56) of the tool tray 10. Each of the wheels 58, 60, 62 and 64 of the swivel casters wheels 42-48 has a diameter so that the bottom facing surface 16 is spaced from the floor surface 70 when the tool tray 10 is placed on the floor as shown in FIG. 5. The bottom surface facing surfaces (26*e*, 28*e*, 30*e*, and 32*e*) of the rectangular supports 26, 28, 30, and 32, respectively, of the rectangular supports 26-32 are spaced from the floor surface 70 so that the tool tray 10 can be easily moved around. Then, when the user desires, the tool tray 10 can be place on the tire as shown FIG. 1 and held in place by the friction fit with the rectangular supports 26, 28, 30, and 32, as discussed herein before.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A tool tray for placing on a floor and on a tire, comprising:

top and bottom facing surfaces surrounded by front and rear panels and first and second side panels forming an open top enclosure for receiving and storing tools;

a plurality of rectangular supports projecting downward from the bottom facing surface to support the tool tray on the tire;

a plurality of swivel caster wheels mounted to the bottom facing surface whereby the tool tray can freely move on the floor;

the plurality of swivel caster wheels each include a wheel which extends below each of the plurality of rectangular supports whereby the tool tray can freely move on the floor;

each of the plurality of rectangular supports has a front facing wall, a rear facing wall, an inner facing wall, an outer facing wall and a bottom facing wall; and wherein the bottom facing wall of each of the plurality of rectangular supports has a triangular shape which interfaces with a sloping triangular shaped surface that slopes downward at an angle with respect to the bottom facing wall of the rectangular supports.

2. The tool tray of claim 1 wherein the bottom facing wall of each of the plurality of rectangular supports that slopes downward at an angle of 30 degrees to 60 degrees with respect to the bottom facing wall of the rectangular supports.

3. The tool tray of claim 2 wherein the bottom facing wall of each of the plurality of rectangular supports guide the tire to slide into place between the rectangular supports by contacting the sloped surfaces of the rectangular supports.

4. The tool tray of claim 3 wherein the bottom facing wall of each of the plurality of rectangular supports position the bottom surface of the tool tray to rest against the tire so that the tool tray is secure and can hold tools.

5. The tool tray of claim 4 wherein the front and rear facing walls on the rectangular supports press against the curved top tread portion of the tire so as to stabilize the tool tray on the tire and prevent the tool tray from tilting in a front or rear direction on the tire.

6. The tool tray of claim 5 wherein each of the swivel caster wheels is mounted adjacent one of the rectangular supports and an adjacent corner of the tool tray whereby the bottom surface facing surfaces of the rectangular supports are spaced from the floor surface so that the tool tray can be easily moved around on the floor.

7. A tool tray for placing on a floor and on a tire, comprising:

top and bottom facing surfaces surrounded by front and rear panels and first and second side panels;

a plurality of rectangular supports projecting downward from the bottom facing surface to support the tool tray on the tire;

each of the plurality of rectangular supports has a front facing wall, a rear facing wall, an inner facing wall, an outer facing wall and a bottom facing wall;

a plurality of swivel caster wheels mounted to the bottom facing surface adjacent one of the rectangular supports and an adjacent corner of the tool tray whereby the bottom facing walls of the rectangular supports are spaced from the floor surface so that the tool tray can be easily moved around on the floor; and wherein the bottom facing wall of each of the plurality of rectangular supports has a triangular shape which interfaces with a sloping triangular shaped surface.

8. The tool tray of claim 7 wherein the plurality of swivel caster wheels each include a wheel which extends below each of the plurality of supports whereby the tool tray can freely move on the floor.

9. The tool tray of claim 2 wherein the bottom facing wall of each of the plurality of rectangular supports that slopes downward at an angle with respect to the bottom facing wall of the rectangular supports to guide the tire to slide into place between the rectangular supports by contacting the sloped surfaces of the rectangular supports.

10. The tool tray of claim 9 wherein the bottom facing wall of each of the plurality of rectangular supports that slopes downward at an angle of 30 degrees to 60 degrees with respect to the bottom facing wall of the rectangular supports.

11. The tool tray of claim 10 wherein the bottom facing wall of each of the plurality of rectangular supports position the bottom surface of the tool tray to rest against the tire so that the tool tray is secure and can hold tools.

* * * * *